United States Patent [19]
Motegi et al.

[11] 3,784,855
[45] Jan. 8, 1974

[54] DEVICE FOR COOLING THE COLLECTOR PORTION OF A ROTARY ELECTRIC MACHINE

[75] Inventors: Shoji Motegi, Hitachi; Norihiro Oki, Katsuta; Sadao Mito, Hitachi, all of Japan

[73] Assignee: Hitachi, Ltd., Tokyo, Japan

[22] Filed: Oct. 1, 1971

[21] Appl. No.: 185,744

[30] Foreign Application Priority Data
Oct. 5, 1970 Japan.................. 45/86633

[52] U.S. Cl. .................................... 310/227
[51] Int. Cl. ............................................ H02k 9/28
[58] Field of Search ............... 310/227, 51, 219, 310/58, 63, 239, 243

[56] References Cited
UNITED STATES PATENTS
3,648,086  3/1972  Renner .............. 310/227
3,486,055  12/1969  Lipstein ............ 310/227
2,541,235  2/1951  Gayer ............... 310/227
3,564,315  2/1971  Barton .............. 310/227

Primary Examiner—R. Skudy

[57] ABSTRACT

A device for cooling the collector portion of a rotary electric machine, including a brush adapted to be pressed with a predetermined pressure against a collector ring which is provided on a rotor shaft in such a manner as to rotate with the rotor while being in sliding engagement with the brush, the sliding portion being adapted to be cooled with a forced flow of cooling air, wherein the cooling air is made to flow in substantially the same direction as that in which the brush is compressed, whereby improved current flow characteristics can be established between the collector ring and the brush.

2 Claims, 7 Drawing Figures

INVENTORS
SHOJI MOTEGI, NORIHIRO OKI,
SADAO MITO
BY Craig, Antonelli & Hill
ATTORNEYS

INVENTORS
SHOJI MOTEGI, NORIHIRO OKI,
SADAO MITO

BY Craig, Antonelli + Hill
ATTORNEYS

3,784,855

DEVICE FOR COOLING THE COLLECTOR PORTION OF A ROTARY ELECTRIC MACHINE

BACKGROUND OF THE INVENTION

1. Field Of The Invention

This invention relates generally to a device for cooling the collector portion of a rotary electric machine, and more paticularly to improvements in such a cooling device as adopted in a turbine-driven generator, water-turbine generator or the like, which is adapted to cool the collector portion by means of a forced flow of cooling air.

2. Description of the Prior Art

As well known in the art, in the conventional cooling devices of this type in common use, a forced flow of cooling air is directed between the collector ring which is supported at the rotor side and insulated therefrom and the brush disposed in sliding engagement with the collector ring, by means of a fan or the like which is provided either outside or on the rotor per se.

The necessity to cool such a collector portion arises from the fact that this portion is heated by frictional heat resulting from the sliding movement of the brush in contact with the collector ring and Joule heat resulting from a current flowing therethrough whereby the performance of the electric machine is adversely influenced.

Conversely, in such an arrangement where there occurs little Joule heat and the peripheral speed of the collector ring is so low that there occurs little frictional heat, means for providing a forced flow of cooling air are not required. However, recent trends are such that the capacity per unit of a rotary electric machine is increased so that the peripheral speed of the collector portion is accordingly increased and an increased amount of electric current is caused to flow. This requires that cooling by any coolant other than liquid coolant be effected forcibly. A little forced draught is not sufficient; air should be imparted to the collector portion at a high rate.

Even with a rotary electric machine of high capacity, the collector portion will be cooled down to a certain degree by feeding cooling air thereto at such a high rate. As a result of the precise experiments performed by the inventors, however, it has been found that trouble of the type that has never been previously expected occurs when use is made of such type of cooling.

With an increasing rate of cooling air which is passed forcibly, it becomes more and more likely that the brush which must always be maintained on the collector ring in electrical contact therewith under a predetermined pressure is subject to vibration or a chattering phenomenon on the collector ring.

Due to such chattering phenomenon, the brush tends to vibrate on the collector ring so that the current flow is interrupted, and in the worst case, the brush is broken so that current collection becomes impossible, whereby the rotary electric machine is completely deprived of its function.

At least in the conventional cooling devices, forced ventilation cooling and brush chattering phenomenon are in contradictory relationship, which constitutes a problem difficult to solve. Such chattering phenomenon tends to result from vibration or the like occurring in other portions, and therefore there have conventionally been proposed some countermeasures for preventing this chattering phenomenon. Heretofore, however, the cause of the occurrence of such phenomenon has not been investigated. This is reflected in the fact that most of the conventional countermeasures are to prevent vibration of the brush in the brush holder. Among such conventional countermeasures are one to provide a spring in a portion of the brush holder to press the brush against one side wall of the holder thereby preventing vibration of the brush; one to secure a vibration damper to the inner wall of the brush holder; one to make the direction in which the brush contacts the collector oblique with respect to the rotating direction; one to apply a cushion member of rubber or the like onto the heat portion of the brush and compress the cushion member with the brush spring; and one to make the brush per se soft thereby adsorbing vibration. It will be seen that most of the conventional countermeasures are to directly restrain vibration of the brush thereby preventing the chattering phenomenon.

In the case of a collector device adopted in a machine with a low capacity, the chattering phenomenon can be prevented to a certain degree by resorting to the aforementioned conventional countermeasures. In the case of a machine with a high capacity, however, it is difficult to sufficiently prevent the chattering phenomenon by the conventional countermeasures described above, in so far as cooling air is circulated at a very high rate.

With reference to FIG. 5, decription will now be made of the construction of a conventional device for cooling the collector portion of a high-capacity machine and ventilating action produced therein by which the chattering phenomenon is caused. FIG. 5 shows only one collector ring (actually, there are two collector rings, + and −), wherein collector ring 3 is mounted on a rotary shaft 1 through an insulator 2, and a brush 4 carried by a brush holder 5 slidably rests on the collector ring, electrical connection being established between the brush 4 and the collector ring 3.

Cooling with respect to that portion is effected by means of a fan 6 serving as a ventilation source which is fixed to the rotor shaft and adapted for rotation therewith. In this case, cooling air is axially guided through an axial hole 7 formed in the collector ring 3 and through a gap 8 defined between the surface of the collector ring 3 and the brush holder 5, as shown by arrows.

It is the cooling air flow passing through the gap that directly cools the sliding portion. To facilitate such cooling, there is provided a fan guide 9 having an opening 10 adjacent to the sliding portion so that a sufficient amount of cooling air may be permitted to flow through the gap 8, particularly in the vicinity of that portion where heat is produced due to the sliding engagement between the collector ring 3 and the brush 4.

In operation, such a condition is established, and when cooling air is being forcibly passed by means of the fan 6, the cooling air flowing through the gap 8 is made to flow at a maximum rate at the position of a brush 4a close to the fan 6. The rate of the cooling air flow decreases as the cooling air moves away from the brush 4a toward 4b, 4c. As will be seen from FIG. 7 showing the result of the experiments, the cooling air rate measured at a position A closest to the fan 6 is more than eight times as high as that measured at a position E remotest from the fan.

Everywhere, especially in the vicinity of the measuring position A, the cooling air is directed obliquely with respect to the shaft axis, so that the brushes 4a, 4b disposed near the position A are pressed obliquely by the strong flow of cooling air flowing obliquely.

This phenomenon is illustrated in an enlarged view in FIG. 6, from which it will be seen that the brush 4a is compressed by a force corresponding to a vector sum of a vector P representing the force with which the brush is compressed obliquely by the cooling air and a vector Q representing the force with which the brush 4a is pressed against the collector ring 3 by means of a spring for providing a predetermined surface pressure. As a result, the brush has one corner F of the contact surface thereof disposed in strong contact with the collector ring surface and another corner G disposed in weak contact or out of contact therewith. If the cooling air is permitted to flow at a constant rate, the condition described just above is always maintained. In actuality, however, the cooling air flow speed is varied, although only slightly, depending upon the load imposed on the electric machine and the air flow passage, so that the brush is returned form the aforementioned condition to the original condition and vice versa. This is repeated, and at some point, resonance takes place, thus resulting in a chattering phenomenon. With regard to breakage of the brush, the brush 4a disposed at the position where a maximum speed of air flow occurs is most likely to be subject to such breakage. This is the reason why the corner F of the brush is most liable to be broken.

When forced ventilation of the type described above is adopted, such a phenomenon is less likely to occur than is otherwise expected, under the conditions that the brush 4a is worn to a certain extent. From this, it will be understood how the head portion of the brush in normal conditions is influenced to a great extent by the air flow.

In accordance with this invention, the drawbacks decribed above can be eliminated, and there is provided an ideal cooling device of the aforementioned type.

SUMMARY OF THE INVENTION

It is an object of this invention to provide a device for cooling the collector portion of a high-capacity machine by the use of cooling air, the device being so designed as to be able to effectively prevent the occurrence of a chattering phenomenon which used to inevitably occur due to the cooling air flow in the case of the conventional apparatus.

According to this invention, there is provided a cooling device comprising a collector ring provided on a rotor shaft for rotation therewith, brush means supported by a brush holder and adapted for sliding motion on the collector ring, and ventilating means such as a fan or the like for passing cooling air to the portion where the sliding motion between the collector ring and the brush is effected and portions adjacent thereto, wherein said cooling air is made to flow in substantially the same direction as the direction in which the brush means is pressed against the collector ring, at least at the head side of the brush means, thereby achieving the intended object.

DESCRIPTION OF THE PREFERRED EMBODIMENTS

Figure 1:
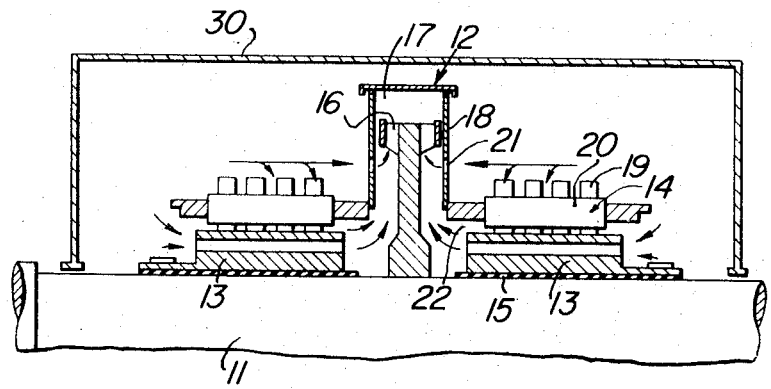
FIG. 1 is a longitudinal sectional side view showing the collector portion of a rotary electric machine provided with a cooling device.

Referring to FIG. 1, there is shown a portion of a collector device comprising a cover 30 of the collector portion adopted in a turbine-generator, rotor shaft 11, ventilation means 12, collector ring 13 and brush means 14.

The rotor shaft 11 has the collector ring 13 secured to the surface thereof through an insulator 15 by means of a shrink fit or the like.

Although not shown, the collector ring 13 is coupled to a winding provided on a barrel portion (this forms magnetic poles) on the rotor shaft by means of lead wires or the like extending through the shaft.

Two collector rings 13 are provided which are axially spaced apart from each other with a predetermined distance maintained therebetween. On the outer peripheral surface of each collector ring 13 are disposed a brush 19 and brush holder 20, and between the two collector rings, there is provided ventilation means 12, such as fan 16 or the like, which is adapted to rotate with the rotor shaft so as to feed cooling air to the collector portion.

Fan guide 18 is provided surrounding the ventilation means 12 whereby cooling air is guided.

One opening portion 22 of the fan guide 18 opens adjacent to the surface of the collector ring 13 and the other opening thereof is coupled to an exhaust port 17.

Balancing ventilation holes 21 are formed in the side wall of the fan guide 18.

Figure 2:
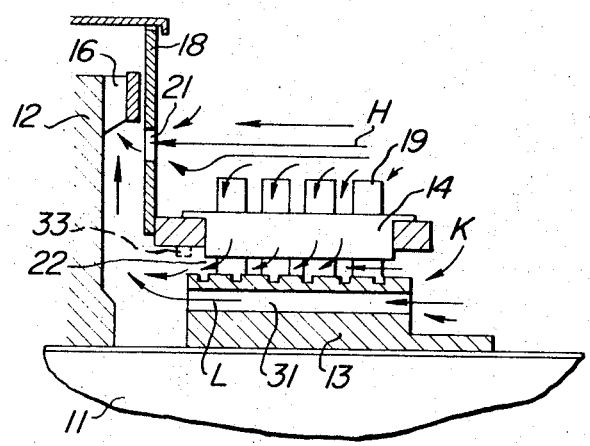
FIG. 2 is a sectional view showing on an enlarged scale a portion of FIG. 1.

The balancing ventilation holes 21 are formed entirely in the periphery of the fan guide at positions on the inside of the fan 16. From the standpoint of the effect described later, it is essential that such ventilation holes be formed at least at the positions corresponding to the positions where they are disposed peripherally of the brush. Description will now be made of the operation of the apparatus having the foregoing construction. In operation, the ventilation means 12 is driven through rotation of the rotor shaft 11. There occur two types of cooling air flow; one (H) is axially directed in the space between the heads of the brush 19 so as to flow into the balancing ventilation holes 21 as shown in FIG. 2, and one (K) is permitted to axially flow on the surface of the collector ring 13 into the opening 22. Of course, there is another cooling air flow (L) which is permitted to pass through the inner hole 31 of the collector ring 13; however, since it is not related to the present invention and is similar to the conventional apparatus, description thereof will be omitted.

Figure 3:
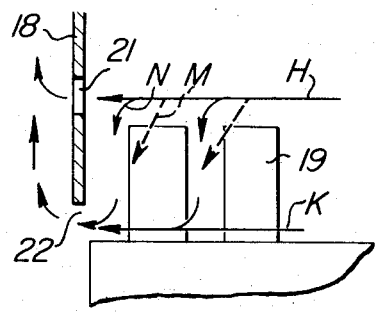
FIG. 3 is a view useful for explaining the flow of cooling air in the collector portion.

The collector portion is cooled predominatly by the cooling air flow shown at K which passes along the surface of the collector portion. As will be seen also from FIG. 3, cooling air flow (M) (shown by dotted line) would be directed obliquely toward the opening 22 in the absence of the balancing ventilation holes 21; actually, it is influenced by a horizontal flow directed to the balancing ventilation holes 21 so that the flow (M) will have its direction changed so as to be a flow (N) as shown by a solid arrow. That is, the flow (M) is redirected to be a radial flow directed toward the axis of the shaft.

In this way, cooling air flowing in the vicinity of the head of the brush 19 which is most liable to be affected by the direction of cooling air flow is directed toward the shaft axis, so that the brush 19 is compressed toward the shaft axis, i.e., in the same direction as that in which the brush is compressed by the spring by the air flow directed as described above. Thus, there is no possibility that the brush is compressed obliquely, and therefore it is possible to effectively prevent the occurrence of chattering phenomenon, breakage and so forth which tend to be caused by the reasons mentioned above.

Determination of the cooling air flowing direction depends largely on the ventilation area of the balancing holes 21 formed in the fan guide and the ventilation area of the opening 22. Needless to say, means 33 for adjusting the amount of ventilation should be provided at either or both of the balancing holes and opening, as shown by dotted lines in FIG. 2. Alternatively, the sizes of the holes and opening mentioned above should be predetermined experimentally.

Although the adjusting ring of the adjusting means is shown as provided on the fan guide side for the purpose of stopping the opening 22 of the fan guide in FIG. 2, it may be provided on the collector ring side. Alternatively, the rate of cooling air flow K passing through the opening 22 may be controlled by utilizing the cooling air L flowing through the internal hole 31 provided in the collector ring.

In the foregoing, description has been made of one embodiment wherein the cooling air is permitted to flow toward the shaft axis or radially. However, various other means adapted to form such flow of cooling air will readily occur to the those skilled in the art.

Figure 4:
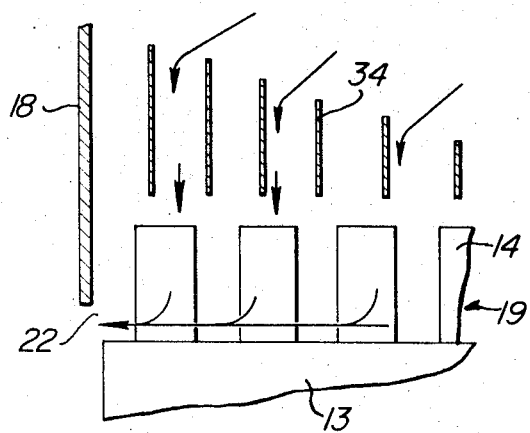
FIG. 4 is a simplified view of collector portion showing another embodiment of this invention.
Figure 5:
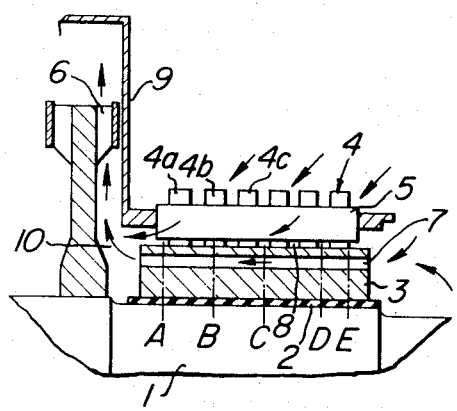
FIG. 5 is a longitudinal sectional side view showing the conventional collector portion.
Figure 6:
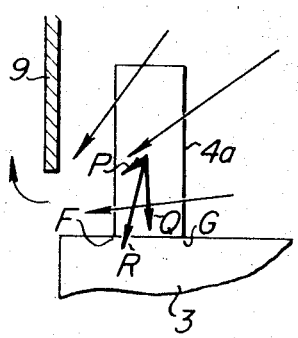
FIG. 6 is a view useful for explaining the relationship between the conventional brush and cooling air.
Figure 7:
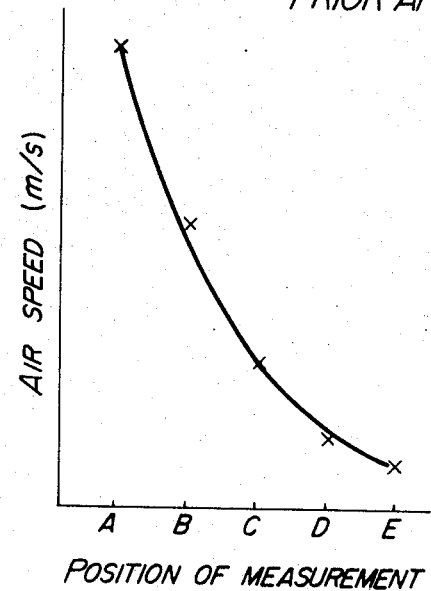
FIG. 7 is a graph showing relationship between various positions in the collector portion and air speed.

Referring to FIG. 4, there is shown another embodiment, wherein a plurality of flow adjusting rings 34 are provided outside and in the vicinity of the brush arrangement 14, with a predetermined spacing being maintained between adjacent ones of the rings 34.

With such an arrangement, the tendency that cooling air flows obliquely toward the sliding surfaces between the brush arrangement and the collector ring 13 is restrained by the flow adjusting rings 34, so that the cooling air is caused to flow in the same direction as that in which the brush arrangement is compressed toward the collector ring, at least at positions corresponding to the heads of the brushes 14. Thus, it is possible to produce the same effect as described above.

It is not necessary that the flow adjusting rings 34 are uniformly spaced from each other. Since the speed of air flow varies depending upon the location of the brush arrangement, the spacing is successively narrowed or the height is decreased toward the portion closet to the suck-in side so that the flowing direction of the cooling air may be more effectively determined.

As described above in detail, with the collector portion cooling device according to the present invention, the cooling air flow for cooling the collector portion is directed in substantially the same direction as the direction in which the brush arrangement is compressed into electrical contact with the collector ring, at least at the opposite side to the sliding surface of the brush arrangement, so that the direction that the brush arrangement is compressed by the flow of cooling air remains unchanged despite variations in the flowing speed of the cooling air, and the contact of the brush arrangement with the surface of the collector ring is always established on the entire surface thereof. Thus, it is possible to prevent occurrence of chattering phenomenon or the like which used to occur inconventional structures, and it is also possible to effectively prevent breakage of the brushes, interruption of current transmission and so forth.

We claim:

1. A cooling device for the collector ring and brush arrangement mounted on the rotor shaft of rotary electric machines comprising ventilation means mounted on said rotor shaft in the vicinity of one end of said collector ring and brush arrangement for sucking in cooling air through the collector ring and brush arrangement, a fan guide in the form of an annular housing located between said ventilation means and one end of said collector ring and brush arrangement for defining the flow paths of cooling air sucked in by said ventilation means with respect to said collector ring and brush arrangement, said fan guide being in a plane transverse to the axis of and extending around said ventilation means on said rotor shaft and being provided with an opening portion adjacent to the surface of the collector ring to permit the cooling air to flow in paths along the surface of the collector ring, and a plurality of balancing ventilation holes provided in said fan guide in a number at least equal to the number of brush arrays and being located axially with respect to the rotor shaft at a height from the rotor shaft corresponding to the brush outer periphery so that part of the cooling air is permitted to flow in a path along the outer surface of the brushes into said plurality of balancing ventilation holes in the direction of the axis of said rotor shaft, thereby controlling the flow of the cooling air in the vicinity of the heads of the brushes to direct it in substantially the same radial direction as that in which the brushes are normally compressed against the collector ring.

2. A cooling device for the collector ring and brush arrangement mounted on the rotor shaft of rotary electric machines comprising ventilation means mounted on said rotor shaft in the vicinity of one end of said collector ring and brush arrangement for sucking in cooling air through the collector ring and brush arrangement, a fan guide in the form of an annular housing with one sidewall thereof between said ventilation means and said one end of said collector ring and brush arrangement for defining the flow paths of cooling air sucked in by said ventilation means with respect to said collector ring and brush arrangement, said fan guide being in a plane transverse to the axis of and extending around said ventilation means on said rotor shaft and being provided with an opening portion adjacent to the surface of the collector ring to permit the cooling air to flow in paths along the surface of the collector ring,
  a plurality of flow adjusting rings fixed to the stator portion of the rotary electric machine and being disposed outside and in the vicinity of the brush arrangement, each of said flow adjusting rings being spaced at predetermined intervals and being in parallel with said fan guide, thereby controlling the flow of the cooling air in the vicinity of the heads of the brushes to direct it radially in substantially the same direction as that in which the brushes are normally compressed.

* * * * *